Oct. 9, 1934.　　　A. G. BUTLER　　　1,976,479
BUNGEE CONTROL
Filed Oct. 25, 1932　　　2 Sheets-Sheet 1
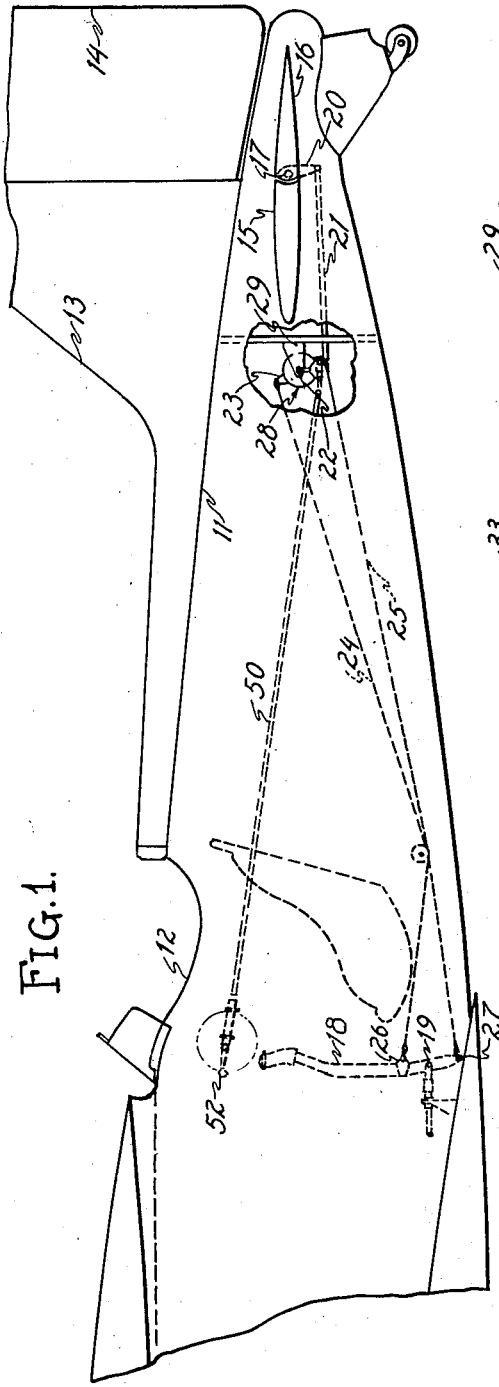
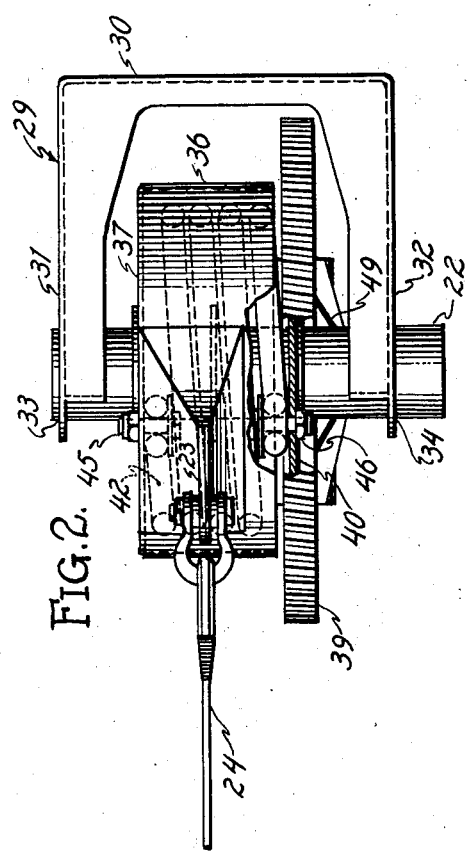
INVENTOR
ARTHUR G. BUTLER.
BY his ATTORNEY

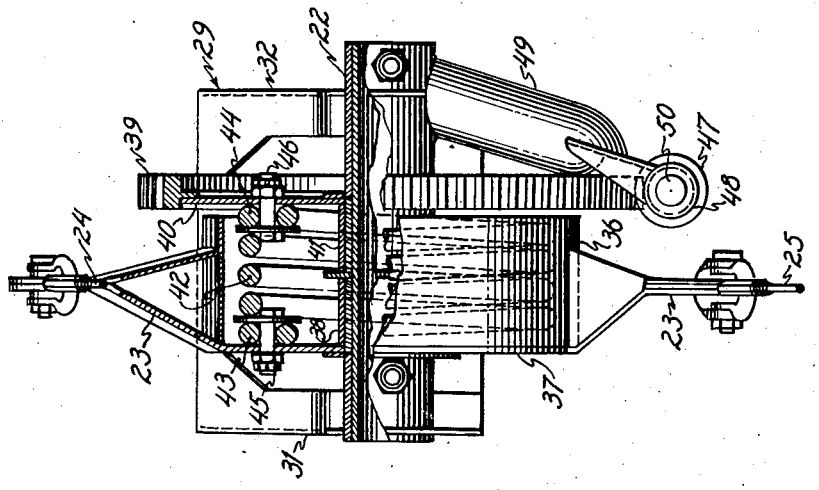
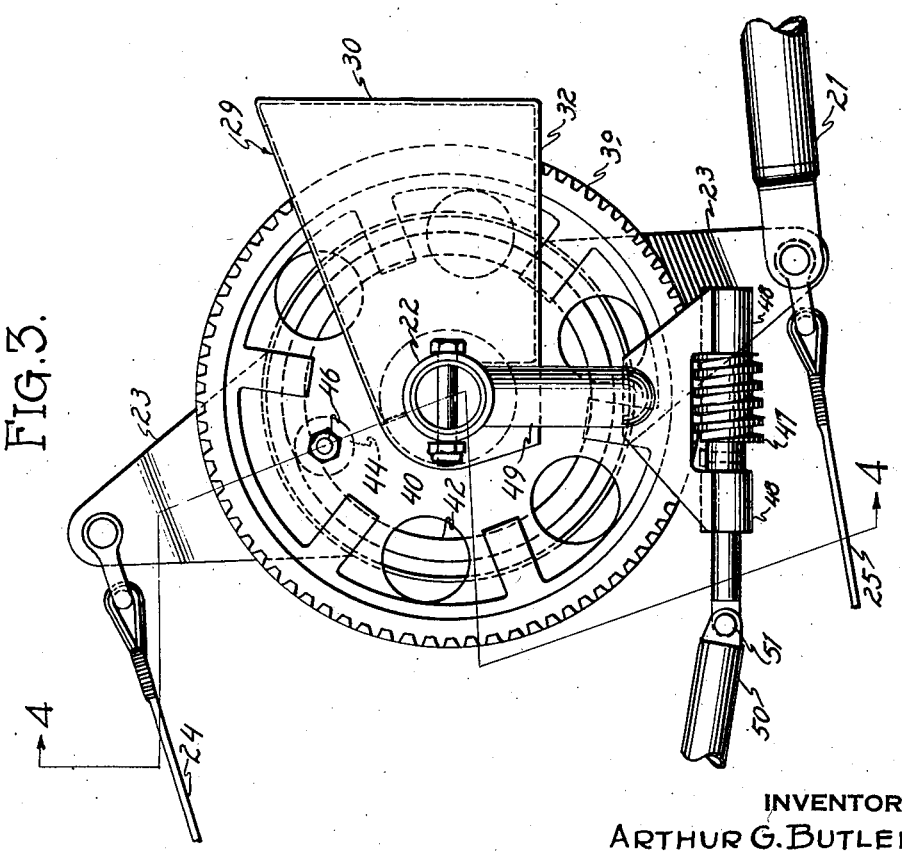

Patented Oct. 9, 1934

1,976,479

UNITED STATES PATENT OFFICE 1,976,479

BUNGEE CONTROL

Arthur G. Butler, Kenmore, N. Y., assignor to Curtiss Aeroplane & Motor Company, Inc., a corporation of New York Application October 25, 1932, Serial No. 639,431

3 Claims. (Cl. 244—29)

This invention relates to aircraft, and more particularly to an auxiliary resilient control mechanism for use in conjunction with the ordinary air controls of the aircraft. This type of control is sometimes known in the aircraft art as a "Bungee" control.

Ordinarily, an airplane is equipped with an adjustable horizontal stabilizer toward the rearward portion of the airplane, to which are hinged elevator control surfaces which, by manipulating the associated control apparatus within the airplane, serve to control the airplane about its transverse axis. Adjustment is provided for in the horizontal stabilizer mechanism in order that the pilot may compensate for load variations in flight, whereby it is unnecessary for him to keep a constant pressure on the control stick should the airplane have a tendency to fly tail heavy or nose heavy. Such tail heaviness or nose heaviness is induced by unbalanced loading of the airplane about its center of gravity; for instance, if a passenger airplane is fully loaded, it tends to fly tail heavy, in which case the pilot adjusts the horizontal stabilizer toward the "nose down" position to maintain level flight. If, on the other hand, the airplane is lightly loaded, it tends toward a nose heavy condition, in which case the pilot adjusts the horizontal stabilizer toward the "nose up" position to compensate the condition to obtain level flight. In certain types of aircraft, particularly small high speed military aircraft, wherein the load variation is comparatively small, it has been found desirable to dispense with the usual adjustable horizontal stabilizer, and to provide in place thereof a fixed horizontal stabilizer which naturally can be made stronger and more rigid, and by virtue of the elimination of the adjusting mechanism, weight and complication may be saved. When the horizontal stabilizer is fixed, it is then incumbent upon the pilot to compensate for slight differences in loading which would cause tail heaviness or nose heaviness in flight, by pressure upon the control stick. Particularly, when the airplane has a tendency to fly tail heavy, it is necessary for the pilot to push forward on the stick to maintain level flight, and this constant pressure, over a protracted length of time, becomes very irksome.

It is an object of this invention to provide adjustable resilient means for maintaining pressure upon the horizontal control surfaces, which may be adjusted by the pilot to compensate for unbalanced loading of the airplane.

A further object of the invention is to provide an auxiliary resilient control mechanism for the horizontal elevator surfaces which is light in weight and simple in construction, so that the gain in weight and simplicity is material over and above the weight and complexity of the usual adjustable horizontal stabilizer.

A further object of the invention is to provide resilient means of a mechanical nature which will not depreciate, deteriorate or wear out in use.

Further objects will be apparent from a reading of the subjoined specification and claims and from a consideration of the accompanying drawings.

In the prior art it has been common to provide rubber cord for exerting a balancing pressure upon controls to ease the pressure exerted upon such controls by the pilot, but it is evident that over a period of time, such rubber cords deteriorate and require frequent replacement, which is obviously a considerable disadvantage. My construction generally provides a countershaft between the pilot's control mechanism and the horizontal elevator control surfaces. A lever is pivoted on this countershaft, and to the lever ends are attached the cables, or their equivalent, extending rearwardly from the control stick. To the lever is also pivoted a rearwardly extending member attached to the control surface. Thus, movement of the control stick is transmitted positively and directly to the control surface. To the lever is attached one end of a helical spring, and to the other end of the helical spring is attached a gear pivoted for rotation on the countershaft. A worm, having axial shafting extending forwardly to the pilot's compartment, engages the teeth of the gear, so that by turning the worm, the gear is turned on the countershaft and the end of the spring attached to the gear is moved. By the resilient action of the spring, pressure is exerted according to the direction of rotation of the gear, to move the elevator up or down. The shafting has a suitable handle at its forward end which the pilot may turn, and indices are located adjacent the handle to indicate the direction in which the shaft should be turned for "nose down" or "nose up" adjustment. If the airplane in flight should have a tendency to be tail heavy, the compensating movement necessary in the control surface would be to raise the tail, or to depress the nose. Hence, the pilot will turn the shafting in the "nose down" direction, whereupon level flight may be attained without the necessity of the pilot exerting compensating pressure on the control stick.

To more clearly explain an embodiment of my invention, reference may be made to the drawings, in which similar numbers designate similar parts, and in which:

Fig. 1 is a side elevation of part of an airplane embodying the invention, partly broken away to show the location of the resilient control mechanism;

Fig. 2 is a plan, partly broken away, of the resilient control mechanism and associated parts;

Fig. 3 is a side elevation of the mechanism of Fig. 2; and

Fig. 4 is a section on the line 4—4 of Fig. 3.

In a conventional airplane, a fuselage 11 has a pilot's compartment 12 intermediate its length, and has a vertical fin 13, a vertical rudder 14, a fixed horizontal stabilizer 15, and an adjustable horizontal elevating control surface 16 hinged as at 17 adjacent the rear edge of the stabilizer 15. The airplane is likewise equipped with a control stick 18 hinged as at 19 to allow fore and aft movement thereof. The elevator 16 has attached thereto a horn 20, and to the horn 20 is pivoted a control member 21 extending forwardly within the fuselage 11. A countershaft 22 has pivoted thereon a lever 23 to which the control member 21 is pivoted. From the lever 23, control cables 24 and 25 extend forwardly to the control stick 18, to which they are attached at 26 and 27, respectively. The lever 23 also forms a part of the resilient control mechanism generally designated as 28, now to be described.

Referring to Figs. 2, 3 and 4, a bracket 29 is rigidly attached at its face 30 to a rigid part of the fuselage 11. Arms 31 and 32 extend forwardly from the face 30 and are provided at their forward ends with openings 33 and 34, for holding the shaft 22. The lever 23 has formed as part thereof intermediate its ends a drum 36, open at one end and having at its other end a closure 37 pierced at its center to fit over the shaft 22. A sleeve 38 is attached as by welding to the closure 37, and adjacent its pierced portion, to fit over the shaft 22 to form a journal thereabout. A worm wheel or gear 39 has attached thereto a web 40 to which is fixed a sleeve 41 adapted to be journaled about the countershaft 22. By virtue of the sleeves 38 and 41, the closure 37 and the web 40 are held in spaced relation along the countershaft 22 and between the arms 31 and 32.

A helical spring 42, having eyes 43 and 44 formed at its ends, is inserted in the space within the drum 36 and between the closure 37 and the web 40. A bolt 45 serves to anchor the spring eye 43 to the closure 37, and a bolt 46 serves to anchor the spring eye 44 to the web 40 of the gear 39. Thus, it will be seen that if the gear 39 is held rigidly, the spring 42 will tend to return the closure 37, and hence the lever 23, to a neutral position from either direction of displacement.

Means are provided for rotating the gear 39, comprising a worm 47 held in bearings 48, these being anchored to the bracket 29 by a short strut 49. The worm is equipped with a shaft 50 extending forwardly to the pilot's compartment, as shown in Fig. 1. The shaft is equipped intermediate its length with a universal joint 51 to allow for smooth operation of the device should weaving strains be imposed on the mechanism or on the fuselage 11 during flight. At its forward end the shaft 50 is equipped with a right angle beveled gear drive of conventional form, to which is attached a handle 52 adapted to be turned by the pilot.

Fig. 3 shows in detail the connection of the control member 21 with the lever 23, and likewise the connection of the control cables 24 and 25 with the lever 23, whereby movement of the control stick 18 is transmitted to the control surface 16.

It will thus be seen that turning of the handle 52 will rotate the worm 47, the worm wheel 39, and will move the spring eye 44, either clockwise or counter-clockwise according to the direction in which the handle 52 is turned. Such movement tends to resiliently change the neutral position of the control surface 16, and regardless of the changes made by turning the handle 52, positive control of the control surface 16 is not interfered with, since any movements of the control stick 18 are directly transmitted to the control surface 16, and would simply impose a stress in the spring 42. It will be noted that the spring 42 is well protected within the fuselage 11 of the airplane, and that the mechanism is simple and positive in operation, so that replacement of parts and servicing of the resilient mechanism 28 is minimized.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In aircraft having a control surface and operating means therefor, means for resiliently holding said control surface in a substantially neutral position comprising a shaft, a hollow drum mounted for rotation thereon, a connection from said drum to said operating means, a connection from said drum to said control surface, a coil spring lying within and concentric with said drum, one end of said spring being fixed to said drum, a wheel mounted on said shaft and fixed to the opposite end of said spring, and means for adjustably turning said wheel.

2. In aircraft having a control surface, operating means therefor, and a connection between said operating means and said control surface, a lever pivotally mounted in said aircraft and attached at its outer end to said connection, a coil spring fixed at one end to said lever, said spring being substantially concentric with the lever pivot, and means for adjusting the position of the opposite end of said spring in angular relation to said lever.

3. In aircraft having a control surface and an operating connection therefor, a shaft, a lever mounted on said shaft, said connection being attached to said lever, a coil spring concentric with said shaft and attached at one end to said lever, and means on said shaft attached to the opposite end of said spring, said means being turnable in either clockwise or counter-clockwise direction to impose a resilient turning force on said lever, through said spring, in either a clockwise or counter-clockwise direction, respectively.

ARTHUR G. BUTLER.